(12) United States Patent
Zhu

(10) Patent No.: US 12,215,993 B2
(45) Date of Patent: Feb. 4, 2025

(54) METHOD FOR DETERMINING A DENSITY MEASUREMENT VALUE OR A MEASUREMENT VALUE OF A DENSITY-DEPENDENT MEASURAND, AND CORIOLIS MASS FLOWMETER FOR PERFORMING THE METHOD

(71) Applicant: Endress+Hauser Flowtec AG, Reinach (CH)

(72) Inventor: Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 262 days.

(21) Appl. No.: 17/999,473

(22) PCT Filed: Apr. 23, 2021

(86) PCT No.: PCT/EP2021/060717
§ 371 (c)(1),
(2) Date: Nov. 21, 2022

(87) PCT Pub. No.: WO2021/233644
PCT Pub. Date: Nov. 25, 2021

(65) Prior Publication Data
US 2023/0280195 A1 Sep. 7, 2023

(30) Foreign Application Priority Data
May 20, 2020 (DE) ..................... 10 2020 113 762.1

(51) Int. Cl.
*G01F 1/84* (2006.01)
*G01F 15/02* (2006.01)
*G01N 9/00* (2006.01)

(52) U.S. Cl.
CPC .......... *G01F 1/8454* (2013.01); *G01F 1/8431* (2013.01); *G01F 1/8436* (2013.01)

(58) Field of Classification Search
CPC .... G01F 1/8454; G01F 1/8431; G01F 1/8436; G01F 1/84; G01F 15/02; G01F 15/18;
(Continued)

(56) References Cited

U.S. PATENT DOCUMENTS

2013/0055827 A1* 3/2013 Bierweiler ............ G01F 1/8431
73/861.355
2019/0018719 A1 1/2019 Brin
(Continued)

FOREIGN PATENT DOCUMENTS

DE 102012109729 A1 5/2014
DE 102015104931 A1 6/2016
(Continued)

*Primary Examiner* — Brandi N Hopkins
(74) *Attorney, Agent, or Firm* — Kelly J. Smith; Endress+Hauser (USA) Holding, Inc.

(57) ABSTRACT

A method includes registering a first mass flow rate portion measurement value $\dot{m}_1$ of a first flow portion through measuring tubes of a first oscillator and a second mass flow rate portion measurement value $\dot{m}_2$ of a second flow portion through measuring tubes of the second oscillator. A sum of the two mass flow rate portion measurement values gives a mass flow rate total measurement value. The method also includes registering first and second density portion measurement values $\rho_1$, $\rho_2$ of the medium in the flow portions and calculating the effective density measurement value $\rho_{eff}$ as a function of the density portion measurement values $\rho_1$, $\rho_2$ with weightings dependent on the mass flow rate portion measurement values $\dot{m}_1$, $\dot{m}_2$. The different weighting functions are applied for ascertaining the weightings as a function of the mass flow rate portion measurement values.

12 Claims, 2 Drawing Sheets

(58) Field of Classification Search
CPC .......... G01F 1/86; G01F 1/849; G01F 1/8413;
G01F 1/8472; G01F 1/74; G01F 7/00;
G01N 9/00; G01N 11/16
See application file for complete search history.

(56) References Cited

U.S. PATENT DOCUMENTS

2019/0128719 A1   5/2019  Bell et al.
2020/0124452 A1*  4/2020  Bitto ........................ G01F 15/02
2020/0309658 A1* 10/2020  Rieder .................. G01F 1/8477

FOREIGN PATENT DOCUMENTS

DE    102016007905 A1   1/2018
DE    102016112002 A1   1/2018
DE    102017115251 A1   1/2019

* cited by examiner

METHOD FOR DETERMINING A DENSITY MEASUREMENT VALUE OR A MEASUREMENT VALUE OF A DENSITY-DEPENDENT MEASURAND, AND CORIOLIS MASS FLOWMETER FOR PERFORMING THE METHOD

CROSS-REFERENCE TO RELATED APPLICATIONS

The present application is related to and claims the priority benefit of DPMA Patent Application No. 10 2020 113 762.1, filed on May 20, 2020 and International Patent Application No. PCT/EP2021/060717, filed on Apr. 23, 2021, the entire contents of which are incorporated herein by reference.

TECHNICAL FIELD

The present disclosure relates to the determination of a density-dependent measurand.

BACKGROUND

The invention relates to a method for determining a measurement value of at least one measurand, which is selected from a group of measurands, which comprises an effective density measurement value $\rho_{eff}$ and a density-dependent measurand of a flowing medium, by means of a Coriolis mass flowmeter having two oscillators, each of which has two measuring tubes, wherein the measuring tubes of the two oscillators oscillate, in each case, pairwise oppositely to one another, wherein the four measuring tubes are arranged for parallel flow and are brought together inlet-side as well as outlet-side in separate manifolds. The density-dependent measurand can, in such case, especially comprise the volume flow. Volume flow measurement with a Coriolis mass flowmeter, which has only two measuring tubes, which are coupled to form an oscillator, is disclosed, for example, in DE 693 14 780 T2, wherein a mass flow rate measurement value is divided by a density measurement value, in order to obtain a value for the volume flow rate. As long as a measurement transmitter has only one oscillator for ascertaining mass flow rate and density, the way for ascertaining volume flow rate is clear. When, however, a large number of parallel flow paths and more than one oscillator are present, one has to figure out how different density measurement values from the parallel flow paths are to be weighted, especially when greater asymmetries between the mass flow rates occur along with the different densities.

SUMMARY

It is, therefore, an object of the invention to provide a method for ascertaining a representative density value, thus a measurement value of a density-dependent measurand such as a volume flow rate over the total region of flow, as well as to provide a Coriolis mass flowmeter for performing the method. The object is achieved according to the invention by the method and the Coriolis mass flowmeter as defined in the present disclosure.

The method of the invention serves for determining a measurement value of at least one measurand, which is selected from a group of measurands, which comprises an effective density measurement value $\rho_{eff}$ and a density-dependent measurand of a flowing medium, by means of a Coriolis mass flowmeter having two oscillators, each of which has two measuring tubes, wherein the measuring tubes of the two oscillators oscillate, in each case, pairwise oppositely to one another, wherein the four measuring tubes are arranged for parallel flow and are brought together inlet-side as well as outlet-side in separate manifolds, wherein the method comprises steps as follows:

registering a first mass flow rate portion measurement value $\dot{m}_1$ of a first flow portion through the measuring tubes of the first oscillator and a second mass flow rate portion measurement value $\dot{m}_2$ of a second flow portion through the measuring tubes of the second oscillator, wherein the sum of the two mass flow rate portion measurement values gives a mass flow rate total measurement value;

registering a first density portion measurement value $\rho_1$ of the medium in the first flow portion and a second density portion measurement value $\rho_2$ of the medium in the second flow portion; and calculating the effective density measurement value $\rho_{eff}$ as a function of the two density portion measurement values $\rho_1$, $\rho_2$ with weightings dependent on the mass flow rate portion measurement values $\dot{m}_1$, $\dot{m}_2$, characterized in that different weighting functions are applied for ascertaining the weightings as a function of the mass flow rate portion measurement values.

In a first additional development of the invention, the effective density measurement value $\rho_{eff}$ is calculated with at least a first weighting function of the density portion measurement values, when a magnitude of the mass flow rate total measurement value is less than a first limit value. In an embodiment of this additional development, the first limit value amounts to no more than 4%, for example, no more than 3% and, especially, no more than 2% of the measuring range of the mass flowmeter, wherein the first limit value according to this embodiment amounts to not less than 0.1%, especially not less than 0.2% of the measuring range.

In a further development of the invention, the first weighting function comprises an arithmetic average value of the first density portion measurement value $\rho_1$ and the second density portion measurement value $\rho_2$. By applying such a weighting function, the density determination is robust against flow rate fluctuations in the case of small flow rates.

In a further development of the invention, the effective density measurement value $\rho_{eff}$ is calculated with at least a second weighting function of the density portion measurement values, when only one mass flow rate portion measurement value is less than a second limit value.

In an embodiment of this additional development of the invention, the second limit value is less than the first limit value and amounts especially to no more than half of the first limit value.

In a further development of the invention, the second weighting function weights the density portion measurement value belonging to the greater mass flow rate portion measurement value with x and the smaller of the two density portion measurement values with 1−x, wherein x>⅔, especially x>¾. In an embodiment of this additional development of the invention, x=1.

In a further development of the invention the effective density measurement value $\rho_{eff}$ is calculated with a third weighting function, when the magnitude of the mass flow rate total measurement value is not less than the first limit value, and when none of the mass flow rate portion measurement values is less than the second limit value. In an embodiment of this additional development of the invention, the effective density measurement value $\rho_{eff}$ is calculated with the third weighting function equaling a standard density value $p_{standard}$, wherein the standard density value $p_{standard}$ is calculated as follows:

$$p_{standard} = \frac{\dot{m}_1 + \dot{m}_2}{\frac{\dot{m}_1}{\rho_1} + \frac{\dot{m}_2}{\rho_2}}$$

In a further development of the invention, the density-dependent measurand comprises a volume flow rate $\dot{V}$, which is calculated as follows:

$$\dot{V} = \frac{\dot{m}}{\rho_{eff}},$$

wherein $\dot{m}$, the mass flow rate total measurement value, comprises the sum of the two mass flow rate portion measurement values $\dot{m}_1$, $\dot{m}_2$.

The Coriolis mass flowmeter of the invention comprises:
a measuring- and operating circuit; and
two oscillators, each of which has two measuring tubes, wherein the measuring tubes of the two oscillators oscillate, in each case, pairwise oppositely to one another, wherein the four measuring tubes are arranged for parallel flow and are brought together inlet-side as well as outlet-side in separate manifolds, wherein the oscillators have, in each case, at least two oscillation sensors for registering oscillations of the measuring tubes and one exciter for exciting the oscillations;
wherein the measuring- and operating circuit is adapted to drive the exciter, to register signals of the oscillation sensors, and to perform the method of the invention.

BRIEF DESCRIPTION OF THE DRAWINGS

The invention will now be explained in greater detail based on the example of an embodiment shown in the appended drawing, the figures of which show as follows.

DETAILED DESCRIPTION

Figure 1:
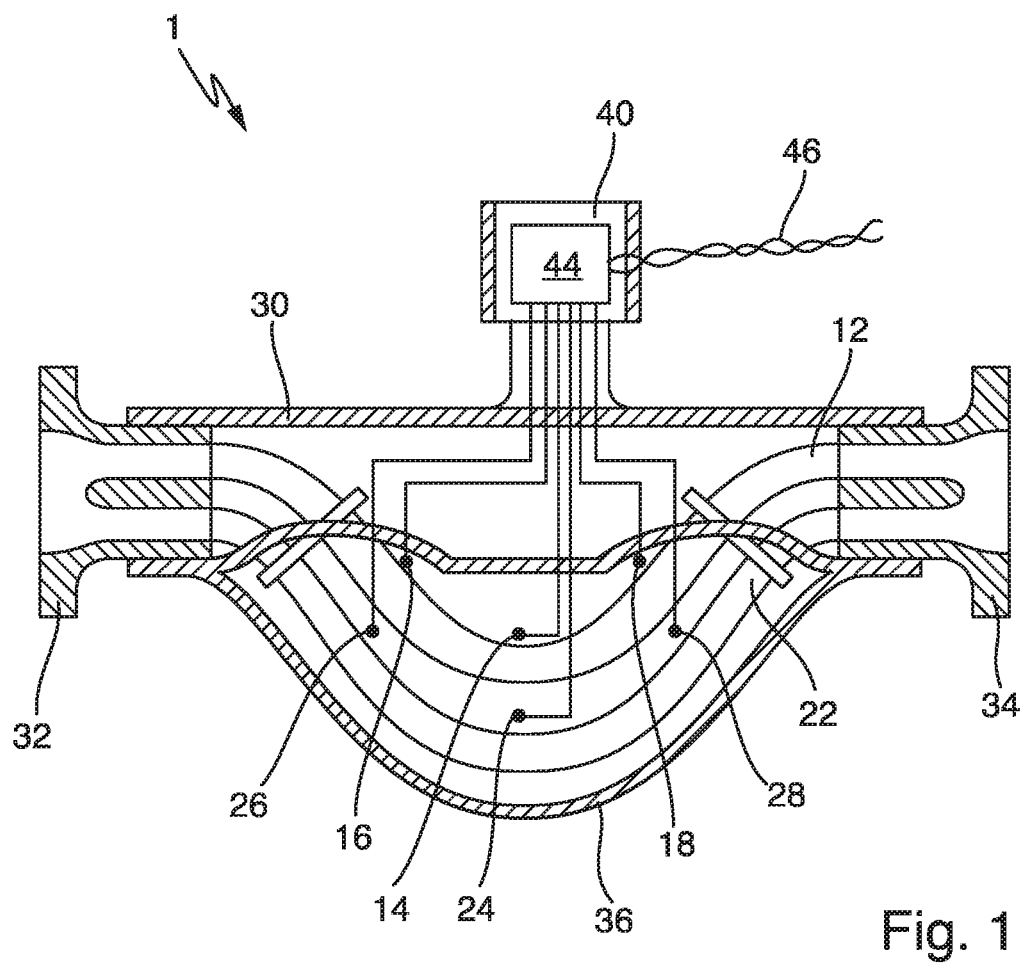
FIG. 1 shows a schematic view of an example of an embodiment of a Coriolis mass flowmeter of the invention in longitudinal section.

The example of an embodiment of a Coriolis mass flowmeter 1 of the invention illustrated in FIG. 1 includes a first oscillator 12 having two bent measuring tubes, whose measuring tube centerlines extend in two mutually parallel planes, wherein an orthogonal projection of the measuring tube centerline of one of the measuring tubes on the plane of the measuring tube centerline of the other measuring tube coincides with the measuring tube centerline of the other measuring tube. The first oscillator 12 includes, additionally, a first electrodynamic exciter 14, which acts between the two measuring tubes of the first oscillator, in order to drive these such that they execute bending oscillations. The first electrodynamic exciter 14 can be arranged in the longitudinal direction of the measuring tubes especially at the half length point, i.e. at the peak of the curves of the measuring tubes.

Furthermore, the first oscillator 12 includes a first, inlet side, electrodynamic oscillation sensor 16 and a first, outlet side, electrodynamic oscillation sensor 18, each of which registers the movements of the measuring tubes of the first oscillator 12 relative to one another. The Coriolis mass flowmeter 1 includes, additionally, a second oscillator 22 having two bent measuring tubes, whose measuring tube centerlines extend in two mutually parallel planes, wherein the orthogonal projection of the measuring tube centerline of one of the measuring tubes on the plane of the measuring tube centerline of the other measuring tube coincides with the measuring tube centerline of the other measuring tube. The second oscillator 22 includes, additionally, a second electrodynamic exciter 24, which acts between the two measuring tubes of the second oscillator, in order to drive these such that they execute bending oscillations. The second electrodynamic exciter 24 can be arranged in the longitudinal direction of the measuring tubes especially at the half length point, i.e. at the peak of the curves of the measuring tubes. Furthermore, the second oscillator 22 includes a second, inlet side, electrodynamic oscillation sensor 26 and a second, outlet side, electrodynamic oscillation sensor 28, each of which registers the movements of the measuring tubes of the second oscillator 22 relative to one another. The first oscillator 12 and the second oscillator 22 have especially two shared planes, in which the measuring tube centerlines extend. The four measuring tubes of the two oscillators are arranged for parallel flow, wherein they are brought together on the inlet side in a first manifold 32 and on the outlet side in a second manifold 34. The manifolds 32, 34 have, in each case, a flange for insertion of the Coriolis mass flowmeter 1 into a pipeline. The manifolds 32, 34 are connected together by a solid support tube 30, in order to suppress movements of the manifolds relative to one another. The bends of the measuring tubes extending outside of the support tube 30 are covered with a housing cap 36, which is connected along a peripheral edge with the support tube, in order to enclose the measuring tubes of the two oscillators 12, 22. The Coriolis mass flowmeter 1 includes, additionally, an electronics housing 40, in which a measuring- and operating circuit 44 is arranged, which is connected with the inlet end sensors 16, 26, the outlet side sensors 18, 28 and the exciters 14, 24, in order to drive the exciters 14, 24, to register signals of the oscillation sensors 16, 18, 26, 28, and to perform the method of the invention, as will be explained in the following. The measuring- and operating circuit 44 is connected via a line 46 to a control system, from which it is supplied with energy and to which it outputs the ascertained measurement values.

Figure 2B:
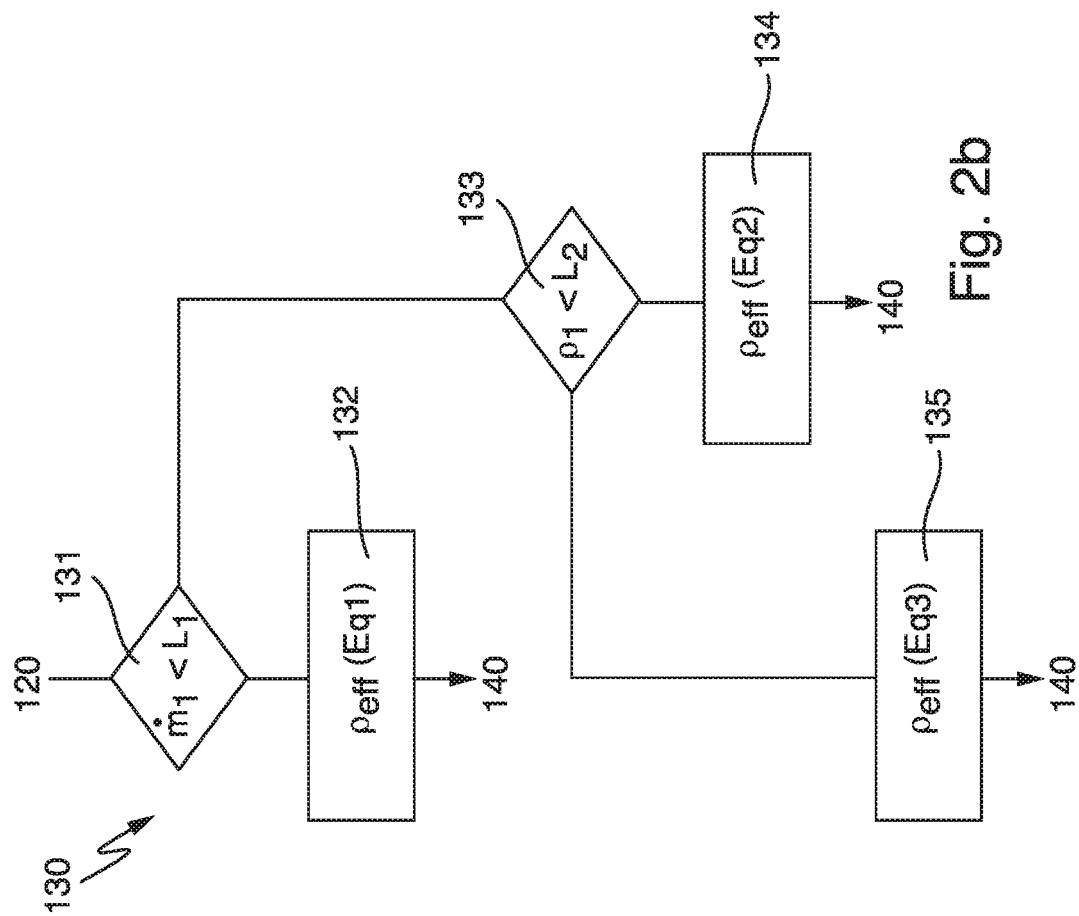
FIG. 2*b* shows a detailed flow diagram of a method step of the example of an embodiment of the method of the invention shown in FIG. 2*a*.
Figure 2A:
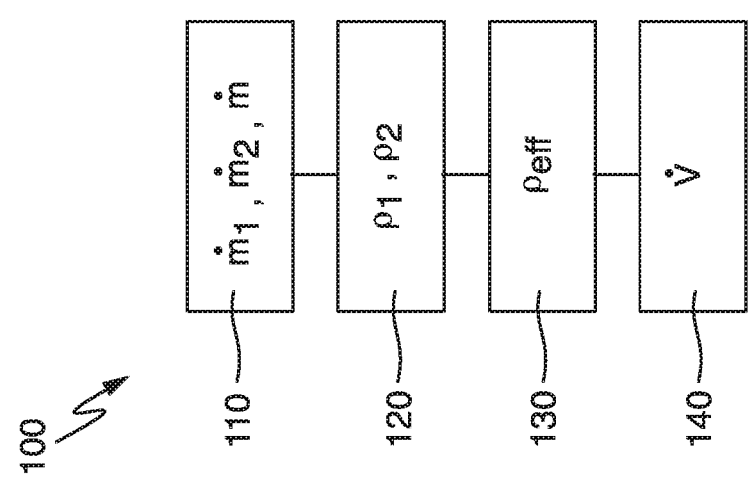
FIG. 2*a* shows a flow diagram of an example of an embodiment of the method of the invention.

The example of an embodiment of the method 100 of the invention illustrated in FIGS. 2*a* and 2*b* begins with the registering 110 of a first mass flow rate portion measurement value $\dot{m}_1$ of a first flow portion through the measuring tubes of the first oscillator and a second mass flow rate portion measurement value $\dot{m}_2$ of a second flow portion through the measuring tubes of the second oscillator, each of which values is determined based on a phase difference, or a time delay, between the sensor signals of its oscillator and an oscillator specific calibration factor.

The sum of the two mass flow rate portion measurement values $\dot{m}_1$, $\dot{m}_2$ corresponds to a mass flow rate total measurement value $\dot{m}$;

There follows the registering 120 of a first density portion measurement value $\rho_1$ of the medium in the first flow portion and a second density portion measurement value $\rho_2$ of the medium in the second flow portion. For this, for each of the two oscillators, a resonant frequency of at least one bending oscillation mode is ascertained, in order, based on such, to ascertain a density portion measurement value for the medium in the measuring tubes of the oscillator.

Then, there occurs the calculating 130 of the effective density measurement value $\rho_{\it{eff}}$ as a function of the two density portion measurement values $\rho_1$, $\rho_2$ with weightings dependent on the mass flow rate portion measurement values $\dot{m}_1$, $\dot{m}_2$, wherein different weighting functions are applied as a function of the mass flow rate portion measurement values for ascertaining the weightings. Details in this connection are explained below using FIG. 2$b$.

Then, based on the mass flow rate total measurement value m and the effective density measurement value $\rho_{\it{eff}}$, there occurs the calculating 140 of the volume flow rate $\dot{V}$ according to:

$$\dot{V} = \frac{\dot{m}}{\rho_{\it{eff}}}.$$

The volume flow rate $\dot{V}$ ascertained in such a way, as well as also the other ascertained measurement values can be output to a control system.

Based on FIG. 2$b$, it will now be explained, which weighting functions are used to calculate the effective density measurement value, and how these weightings functions are selected.

In a first substep (131), it is checked whether the magnitude of the mass flow rate total measurement value $\dot{m}$ is less than a first limit value L1. The first limit value L1 can, for example, amount to 2% of the measuring range of the Coriolis mass flowmeter, thus, 2% of the maximum mass flow rate, for which the device is specified.

In the case of a positive result, the effective density measurement value is determined in a second substep (132) using a first weighting function (Eq1). The first weighting function (Eq1) comprises forming an arithmetic average value of the first density portion measurement value $\rho_1$ and the second density portion measurement value $\rho_2$, thus, $\rho_{\it{eff}}=(\rho_1+\rho_2)/2$.

In the case of a negative result, it is checked in a second test in a third substep (133) whether exactly one of the mass flow rate portion measurement values is less than a second limit value L2, wherein it is currently preferred that L2=L1/2.

In the case of a positive result in this second test, the effective density measurement value $\rho_{\it{eff}}$ is calculated in a fourth substep (134) with a second weighting function Eq2 of the density portion measurement values $\rho_1$, $\rho_2$, wherein the second weighting function Eq2 weights the density portion measurement value belonging to the greater mass flow rate portion measurement value with x and the lesser of the two density portion measurement values with 1−x, wherein x>⅔, especially x>¾. x can, in such case, especially assume the value 1. In the case of this choice for the parameter x, the effective density measurement value $\rho_{\it{eff}}$ equals the density portion measurement value belonging to the greater mass flow rate portion measurement value.

In the case of a negative result of the second test, the effective density measurement value $\rho_{\it{eff}}$ is calculated in a fifth substep (135) with a third weighting function Eq3. The effective density measurement value $\rho_{\it{eff}}$ calculated with the third weighting function equals a standard density value $\rho_{\it{standard}}$, wherein the standard density value $\rho_{\it{standard}}$ is calculated as follows:

$$\rho_{\it{standard}} = \frac{\dot{m}_1 + \dot{m}_2}{\frac{\dot{m}_1}{\rho_1} + \frac{\dot{m}_2}{\rho_2}}$$

The effective density measurement value $\rho_{\it{eff}}$ can be calculated with the above equation for the standard density value, however, also by means of other equivalent equations, which lead to the same result.

The invention claimed is:

1. A method for determining a measurement value of at least one measurand, which is selected from a group of measurands, which comprises an effective density measurement value $\rho_{\it{eff}}$ and a density-dependent measurand of a flowing medium, using a Coriolis mass flowmeter having two oscillators, each of which has two measuring tubes, wherein the measuring tubes of the two oscillators oscillate, in each case, pairwise oppositely to one another, wherein the four measuring tubes are arranged for parallel flow and are brought together inlet-side as well as outlet-side in separate manifolds, wherein the method comprises method steps as follows:
   registering a first mass flow rate portion measurement value $\dot{m}_1$ of a first flow portion through the measuring tubes of the first oscillator and a second mass flow rate portion measurement value $\dot{m}_2$ of a second flow portion through the measuring tubes of the second oscillator, wherein the sum of the two mass flow rate portion measurement values gives a mass flow rate total measurement value;
   registering a first density portion measurement value $\rho_1$ of the medium in the first flow portion and a second density portion measurement value $\rho_2$ of the medium in the second flow portion; and
   calculating the effective density measurement value $\rho_{\it{eff}}$ as a function of the two density portion measurement values $\rho_1$, $\rho_2$ with weightings dependent on the mass flow rate portion measurement values $\dot{m}_1$, $\dot{m}_2$,
   wherein different weighting functions are applied for ascertaining the weightings as a function of the mass flow rate portion measurement values.

2. The method of claim 1, wherein the effective density measurement value $\rho_{\it{eff}}$ is calculated with at least a first weighting function of the density portion measurement values, when a magnitude of the mass flow rate total measurement value is less than a first limit value.

3. The method as claimed in claim 2, wherein the first weighting function comprises an arithmetic average value of the first density portion measurement value $\rho_1$ and the second density portion measurement value $\rho_2$.

4. The method of claim 3, wherein the effective density measurement value $\rho_{\it{eff}}$ is calculated with a third weighting function, when the magnitude of the mass flow rate total measurement value is not less than the first limit value, and when none of the mass flow rate portion measurement values is less than the second limit value.

5. The method of claim 4, wherein the effective density measurement value $\rho_{\it{eff}}$ calculated with the third weighting function (Eq3) equals a standard density value $\rho_{\it{standard}}$, wherein the standard density value $\rho_{\it{standard}}$ is calculated as follows:

$$\rho_{\it{standard}} = \frac{\dot{m}_1 + \dot{m}_2}{\frac{\dot{m}_1}{\rho_1} + \frac{\dot{m}_2}{\rho_2}}.$$

6. The method of claim 1, wherein the effective density measurement value $\rho_{e\!f\!f}$ is calculated with at least a second weighting function of the density portion measurement values $\rho_1$, $\rho_2$, when only one mass flow rate portion measurement value is less than a second limit value.

7. The method as claimed in claim 6, wherein the second limit value is less than the first limit value.

8. The method as claimed in claim 6, wherein the second limit value amounts to no more than half of the first limit value.

9. The method of claim 8, wherein x=1.

10. The method of claim 6, wherein the second weighting function weights the density portion measurement value belonging to the greater mass flow rate portion measurement value with x and the smaller of the two density portion measurement values with 1−x.

11. The method of claim 1, wherein the density-dependent measurand comprises a volume flow rate $\dot{V}$, which is calculated according to:

$$\dot{V} = \frac{\dot{m}}{\rho_{e\!f\!f}},$$

wherein $\dot{m}$, the mass flow rate total measurement value, includes the sum of the two mass flow rate portion measurement values $\dot{m}_1$, $\dot{m}_2$.

12. A coriolis mass flowmeter, comprising:
a measuring and operating circuit; and
two oscillators, each of which has two measuring tubes, wherein the measuring tubes of the two oscillators oscillate, in each case, pairwise oppositely to one another, wherein the four measuring tubes flow are arranged for parallel flow and are brought together inlet-side as well as outlet-side in separate manifolds, wherein the oscillators have, in each case, at least two oscillation sensors for registering oscillations of the measuring tubes and an exciter for exciting the oscillations; wherein the measuring and operating circuit is adapted to drive the exciter, to register signals of the oscillation sensors, to perform the following method:

registering a first mass flow rate portion measurement value $\dot{m}_1$ of a first flow portion through the measuring tubes of the first oscillator and a second mass flow rate portion measurement value $\dot{m}_2$ of a second flow portion through the measuring tubes of the second oscillator, wherein the sum of the two mass flow rate portion measurement values gives a mass flow rate total measurement value;

registering a first density portion measurement value $\rho_1$ of the medium in the first flow portion and a second density portion measurement value $\rho_2$ of the medium in the second flow portion; and calculating the effective density measurement value $\rho_{e\!f\!f}$ as a function of the two density portion measurement values $\rho_1$, $\rho_2$ with weightings dependent on the mass flow rate portion measurement values $\dot{m}_1$, $\dot{m}_2$, wherein different weighting functions are applied for ascertaining the weightings as a function of the mass flow rate portion measurement values.

* * * * *